US005841463A

United States Patent [19]

Debesis et al.

[11] Patent Number: 5,841,463

[45] Date of Patent: Nov. 24, 1998

[54] ALIGNMENT CORRECTION FOR LASER PRINT HEADS

[75] Inventors: John R. Debesis, Penfield; Kenneth L. Baker, Rochester, both of N.Y.

[73] Assignee: Eastman Kodak Company, Rochester, N.Y.

[21] Appl. No.: 672,161

[22] Filed: Jun. 27, 1996

[51] Int. Cl.[6] .............................. B41J 2/47; G02B 26/00

[52] U.S. Cl. .............................................. 347/242; 347/244

[58] Field of Search .................................... 347/238, 241, 347/242, 244; 359/811, 819

[56] References Cited

U.S. PATENT DOCUMENTS

| | | | |
|---|---|---|---|
| 4,383,755 | 5/1983 | Fedder et al. | 355/11 |
| 4,496,209 | 1/1985 | Itoh et al. | 350/6.8 |
| 4,639,072 | 1/1987 | Itoh et al. | 350/6.8 |
| 4,804,981 | 2/1989 | Prakash et al. | 346/160 |
| 5,218,413 | 6/1993 | Kanai | 355/326 |
| 5,515,391 | 5/1996 | Endriz | 372/34 |
| 5,646,674 | 7/1997 | Bacon et al. | 347/257 |

*Primary Examiner*—Eddie C. Lee
*Assistant Examiner*—Christopher E. Mahoney
*Attorney, Agent, or Firm*—Nelson Adrian Blish; David A. Novais

[57] ABSTRACT

An apparatus and method of manufacturing a laser print head include the steps of mounting a laser array (70) on a print head block (80), measuring misalignment of the laser array (70) to determine a correction factor, mounting a cylinder lens (20) on a cylinder lens holder (25), inducing a predetermined bend into the cylinder lens (20) corresponding to the correction factor by allowing the cylinder lens (20) to sag on upright posts (26) of the cylinder lens holder (25), attaching the cylinder lens (20) to a sub-mount (30), attaching flexures (50) to the sub-mount (30), aligning the cylinder lens (20) to the laser array (70), and attaching the flexures (50) to the print head block (80). The bend in the cylinder lens corrects for misalignment in the laser array (70) so that the array of spots at the image plane is in an approximately straight line. In one embodiment, the sub-mount and cylinder lens have approximately the same thermal coefficient of expansion.

29 Claims, 9 Drawing Sheets

ALIGNMENT CORRECTION FOR LASER PRINT HEADS

BACKGROUND OF THE INVENTION

1. Field of the Invention

This invention relates to laser printers in general, and in particular to a method and apparatus for attaching micro-optics to laser arrays to correct for misalignment of diode lasers in a laser array.

2. Description of Related Art

In one type of thermal printer, a dye-donor element is placed over a receiver. The superposed elements cooperate with a print head having a laser array with plurality of individual lasers. When a particular laser is energized, it causes dye from the donor to transfer to the receiver. The density (i.e., darkness) of the pixel printed is related to the amount of colored dye transferred to the receiver, which is a function of the energy delivered from the lasers to the donor. The lasers are usually arranged in a linear array of diode lasers which can be selectively actuated to direct radiation onto the dye donor. The laser array forms successive swaths of scan lines on the receiver as the laser array and the receiver are moved relative to each other. Each of the swaths includes a plurality of parallel scan lines.

A new generation of laser dye printers uses a laser diode array with ten individually addressable write elements. Each write element includes sixteen single mode lasers. The divergence of laser beams in a cross array direction is minimized by focusing the light through a cylinder lens and then overlapping, or combining the light with a combiner lens, resulting in a single write spot.

It is necessary to accurately focus light from the output ends of the lasers onto the dye donor to produce high quality images. To do this, the output ends of the lasers must be in a single, well defined plane. Accurate alignment between the lasers and the cylinder lens is also necessary to precisely control the amount of dye transferred.

A problem encountered with the type of construction described is related to the small diameter of the cylinder lenses. Typical cylinder lens diameters are on the order of 50 microns to 200 microns. These cylinder lenses may sag under their own weight during assembly, creating a misalignment between the laser array and the cylinder lens, and causing lost production time to correct the problem. Misalignment may also occur during operation, due to thermal contraction or expansion of the mounting assembly used to hold the cylinder lens. This misalignment reduces the amount of energy transferred to the dye donor and the receiver, and adversely affects the quality of printing.

Some manufacturers correct this operational problem by matching the thermal expansion of the cylinder lens to the thermal expansion of the laser array mount. Thus, when the laser array mount changes temperature during operation, the cylinder lens does not sag due to differential thermal expansion between the cylinder lens and the laser array mount. However, this system requires matching the thermal characteristics of the laser array mount and cylinder lens, and laser array mounts from different manufacturers may not match the thermal expansion characteristics of different cylinder lenses, since the composition of the cylinder lenses varies widely. Another method of solving this is shown in U.S. Ser. No. 08/577,590, filed Dec. 22, 1995, assigned to the same assignee as the present invention. This patent application describes a sub-mount which has a coefficient of thermal expansion approximately the same as the thermal expansion of the cylinder lens.

Another problem arises when the diode lasers in the laser array are not in a straight line. FIG. 1 shows a photograph of spots produced at an image plane by an OptoPower 10 watt laser array, which uses 12 multimode diode lasers and a modulator array. The photograph show the non-uniformity in the x-direction of the line of spots due to a misalignment of the diode lasers in the laser array. This non-uniformity is a problem for laser arrays with individually addressable write elements and those which require modulator arrays.

It is important that the laser array project a uniform, straight line of spots onto the image plane. If the laser array is bent and a straight cylinder lens is placed in front of the laser array, the cylinder lens will be vertically displaced with respect to some of the diode lasers in the laser array. This will cause the laser beams from each diode laser to be refracted at different angles, which will produce a curved line at the image plane. The curved non-uniformity is often referred to as "smile."

The non-uniformity is often induced into the laser array when it is soldered to a print head block. For the OptoPower laser discussed above, the non-uniformity or smile is 7.7 microns. The laser array is 100,000 microns long (1 cm.) so the 7.7 microns is small compared to the total length. However, the focal length of these cylinder lenses is on the order of 100 to 300 microns depending on the radius and the refraction index of the fiber. Thus, a 7 micron smile for a 200 micron focal length lens will produce a large deviation from straightness in the far field. At 250 mm away from the laser, the deviation caused by smile can be on the order of several centimeters. Since the amount of smile due to misalignment of the diode lasers in the laser array varies from one laser array to another, a method is needed to correct for the smile.

Various schemes are disclosed in the prior art for correcting smile. U.S. Pat. No. 4,496,209, discloses a laser for use with rotary polygonal mirror. Tilting error due to variation in angles of the mirror surfaces are corrected by bending a cylinder lens with a constraining member. These cylinder lenses are relatively large and relatively large mechanical force is required to produce the necessary bend. U.S. Pat. No. 4,639,072, a Continuation-in-Part of U.S. Pat. No. 4,496,209, discussed above, discloses a rotary polygonal mirror with a cylindrical lens bent to have both ends in a longitudinal direction approaching the scanned plane. U.S. Pat. No. 5,218,413 discloses bending a cylindrical lens by using either an adjustment screw or an electric element, to correct curvature in a scan line. This device is also for a single beam and a rotary polygonal mirror, and has the same limitations discussed above.

SUMMARY OF THE INVENTION

It is an object of the present invention to provide a method and apparatus for attaching micro-optics such as cylinder lenses to a wide variety of laser arrays from different manufacturers, to correct for smile caused by misalignment of diode lasers in a laser array.

A micro-optic assembly according to the present invention has a cylinder lens, and sub-mount. The cylinder lens has a predetermined bend to eliminate smile due to misalignment of diode lasers in a laser array. The cylinder lens is attached to the sub-mount to lock in the predetermined bend.

The invention includes the method of constructing a print head, comprising the steps of determining the amount of smile; calculating the amount of bend in a cylinder lens to correct for the smile; mounting the cylinder lens on a cylinder lens holder; adjusting the length of a free end the cylinder lens to induce sag in the cylinder lens equal to the required amount of bend; and attaching the cylinder lens to a sub-mount. The cylinder lens is then aligned to the laser array and the sub-mount is attached to a print head block. A combiner lens is attached to the sub-mount as a final step in some embodiments.

DETAILED DESCRIPTION OF THE INVENTION

Figure 1:
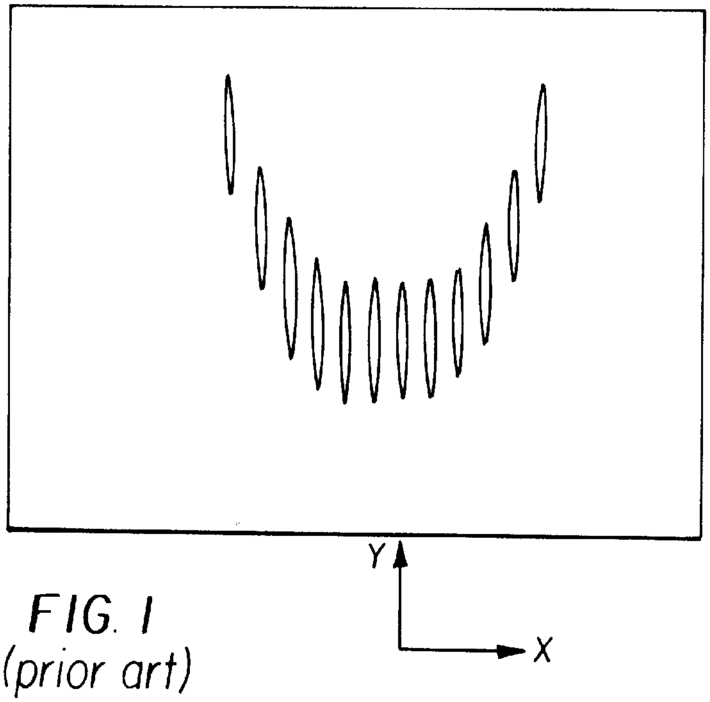
FIG. 1 (prior art)
FIG. 1 shows smile at an image plane due to misalignment of diode lasers in a laser array.
Figure 2:
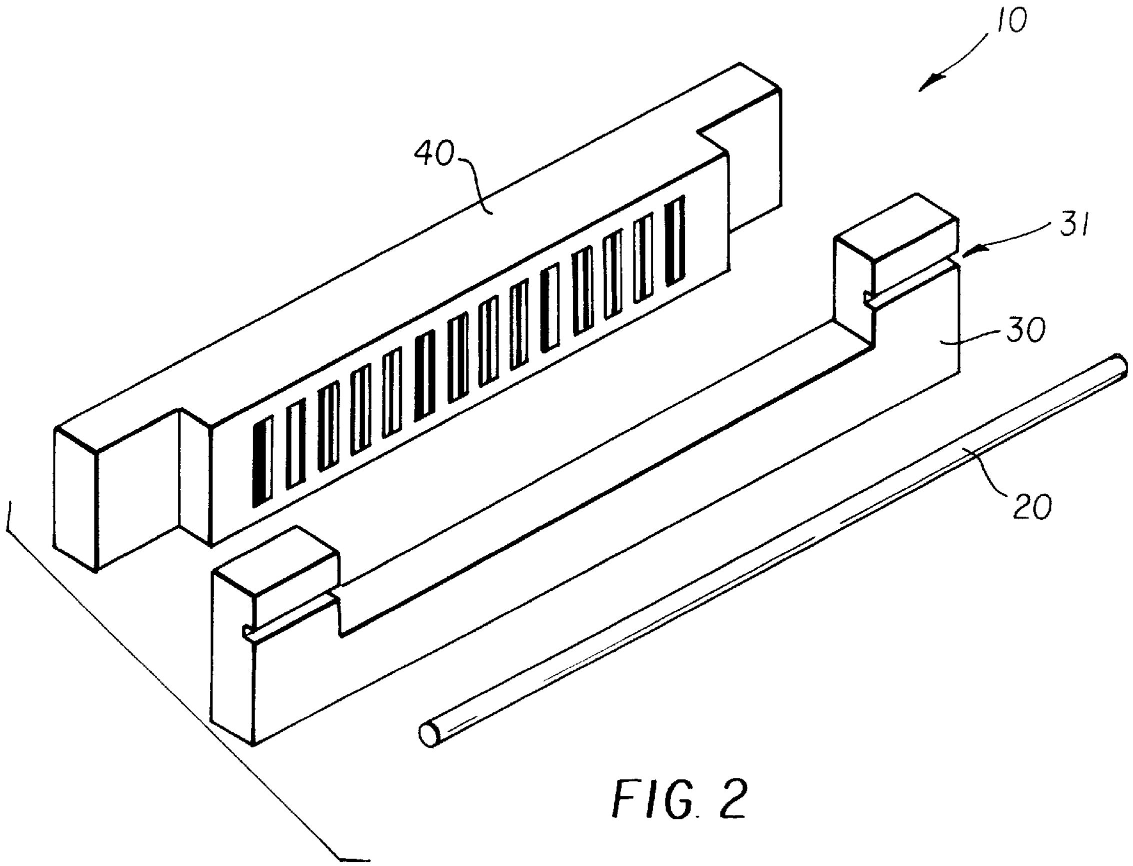
FIG. 2 shows an exploded, perspective view of a micro-optic assembly according to the present invention.

Referring now to FIG. 2, a micro-optics assembly is shown, referred to in general by numeral 10. Micro-optics assembly 10 is comprised of a cylinder lens 20, and sub-mount 30. Combiner lens 40, which is attached to sub-mount 30 at a later step, will be described in more detail below.

The sub-mount 30 is a generally U-shaped structure with slots 31 provided for attaching cylinder lens 20. Slots 31 are cut to accommodate a cylinder lens approximately 100 to 200 micron in diameter, and approximately 1.5 cm long. Sub-mount 30 may be used for cylinder lenses with diameters of 50 to 1000 microns as long as the dimensions of slots 31 are adjusted accordingly.

Figure 3:
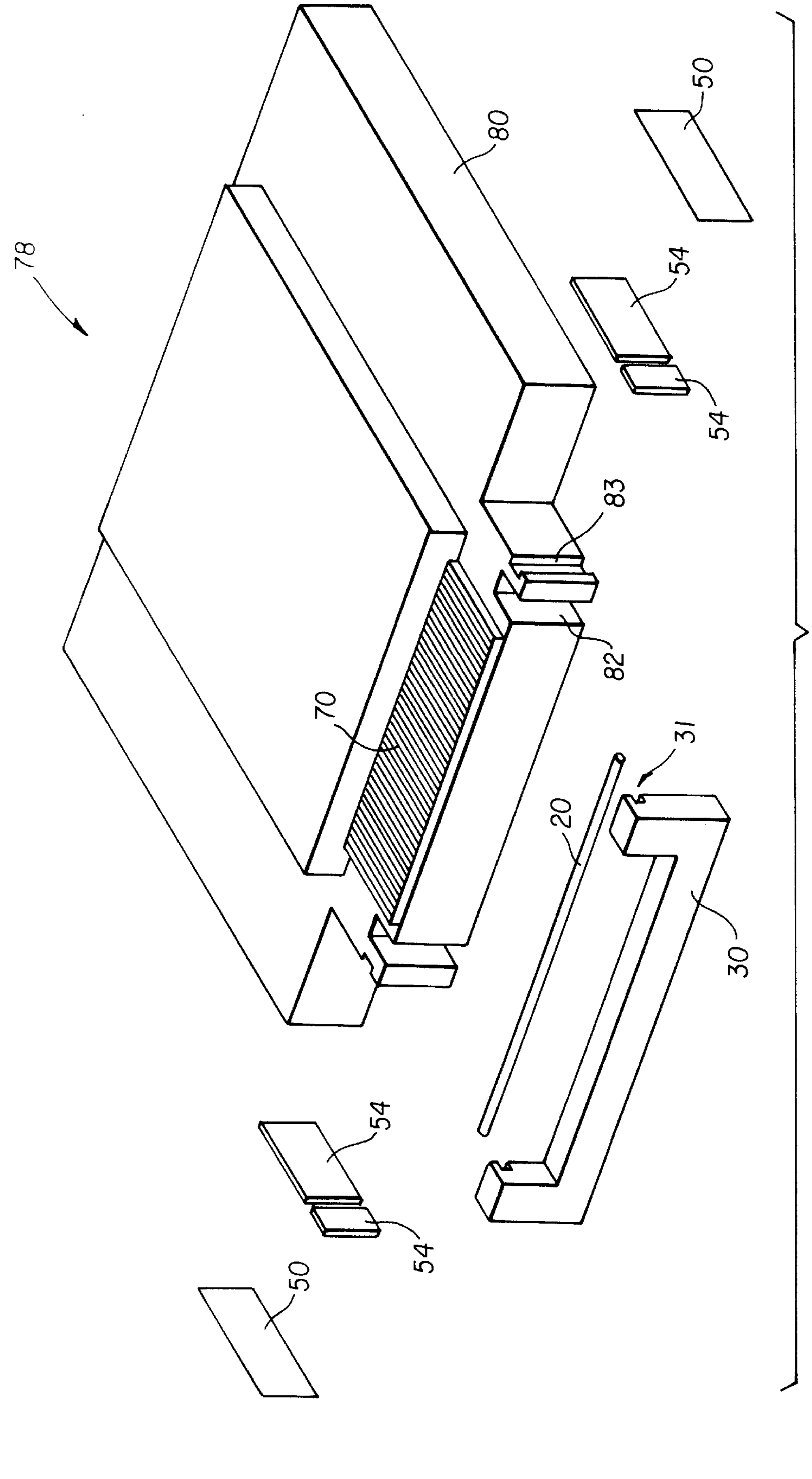
FIG. 3 shows an exploded perspective view of a print head according to the present invention.

A laser array 70, comprised of a plurality of diode lasers, shown in FIG. 3, will typically have some linear misalignment of the diode lasers in the laser array. The misalignment may be due to manufacturing defects or to misalignment of the laser array as it is attached to print head block 80. One method of correcting for this misalignment is to bend the cylinder lens 20 to compensate for the misalignment.

Cylinder lens 20 is extremely flexible and will sag under its own weight if not properly attached to the sub-mount 30. The positioning tolerances for the cylinder lens 20 are critical, and are measured in tenths of microns. To achieve the precision required during assembly, cylinder lens 20 must be accurately attached to sub-mount 30 in a manner that will prevent movement once the bend is established.

Figure 4:
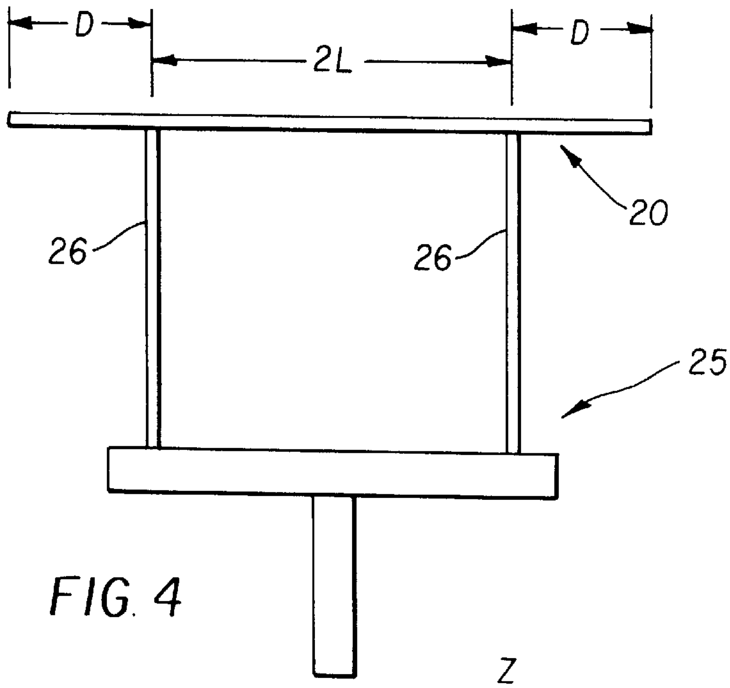
FIG. 4 is a plan view, showing dimensional coordinates of a cylinder lens holder used in attaching a cylinder lens to the sub-mount shown in FIG. 2.

To bend cylinder lens 20, the cylinder lens 20 is first attached to the to cylinder lens holder 25, shown in FIG. 4. Attachment may be by mechanical means or adhesive, and is a temporary step. The cylinder lens holder 25 is used to place a uniform bend in the cylinder lens 20 by allowing a predetermined amount of sag in cylinder lens 20. It was discovered that it is possible place a bend in cylinder lens 20 that is accurately reproducible, and which corrects for smile to within two microns or less.

Figure 5:
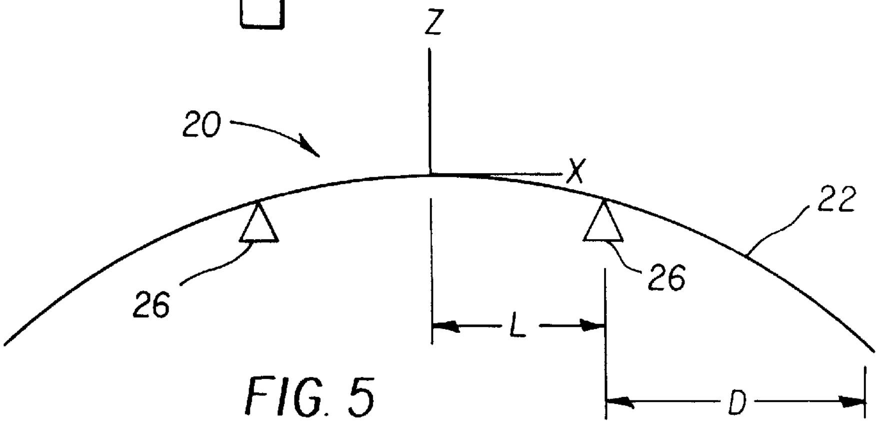
FIG. 5 show a schematic representation of a bent cylinder lens and appropriate reference coordinates.
Figure 6:
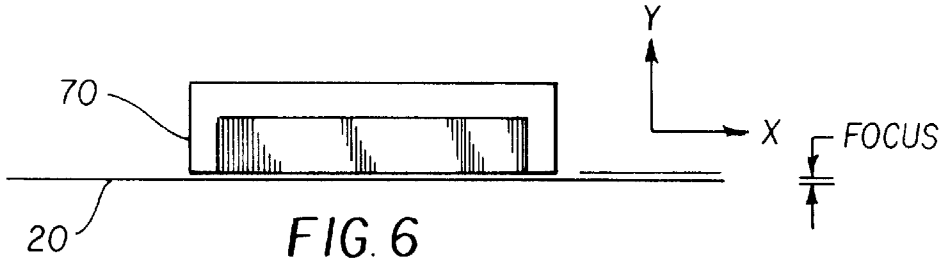
FIG. 6 is a top plan view of a laser array and a cylinder lens.
Figure 7:
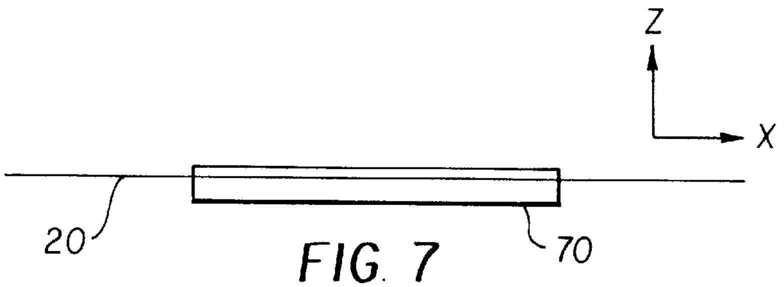
FIG. 7 is a front plan view of a laser array and a cylinder lens.

Uniform bending of the cylinder lens is achieved by letting the cylinder lens 20 sag under its own weight. When a cylinder lens 20 is laid across the posts 26 of cylinder lens holder 25, shown schematically in FIG. 5, the free ends 22 sag, causing a bend in the cylinder lens 20. The bend shown is exaggerated for purposes of illustration. For small bends the deflection of a cylinder is given by the following formula. Coordinates associated with sag in the cylinder lens are shown in FIGS. 5, 6 and 7.

$$Z = \frac{w}{2EI}\left[\frac{L^4}{12} + \frac{d^2L^2}{2} + \left(L^2 - \frac{d^2}{2}\right)x^2 - \frac{1}{12}x4\right]$$

where:

Z=a height of the bend above the x-axis w=Distribute Load (Force due to gravity/unit length)

E=Young's Modulus

Figure 8:
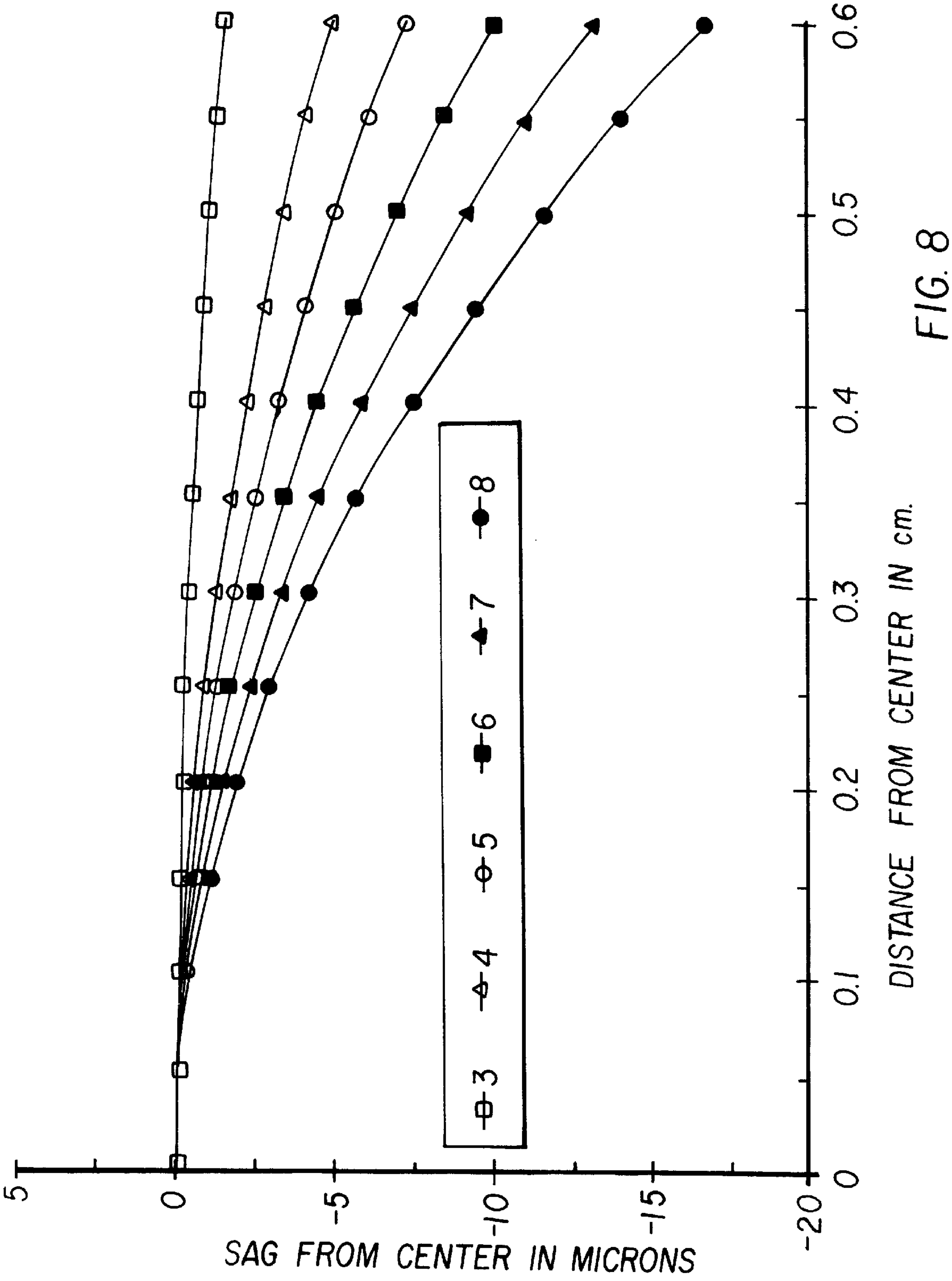
FIG. 8 is a graph of sag or bend in a cylinder lens with a free end length of one centimeter.

I=Moment of Inertia of Cross Section of Cylinder Lens r=Radius of the Cylinder Lens L=Length from Center Line of Cylinder Lens to Holder Post D=Length of Cylinder Lens Free End Calculations for the bend as a function of L and D were performed by using the above equation for a 150 micron diameter cylinder lens with a density of 2.2 grams per cubic centimeter and a Young's Modulus of 10,000,000 psi. FIG. 8 shows a graph of the cylinder lens bend for a value of D=1 cm and value of L from 3 to 8 cm. Bend values, from the center of the cylinder lens to the end of the cylinder lens, of 1 micron to 12 microns across the 1.0 cm length of the cylinder lens, are easily achieved.

Figure 9:
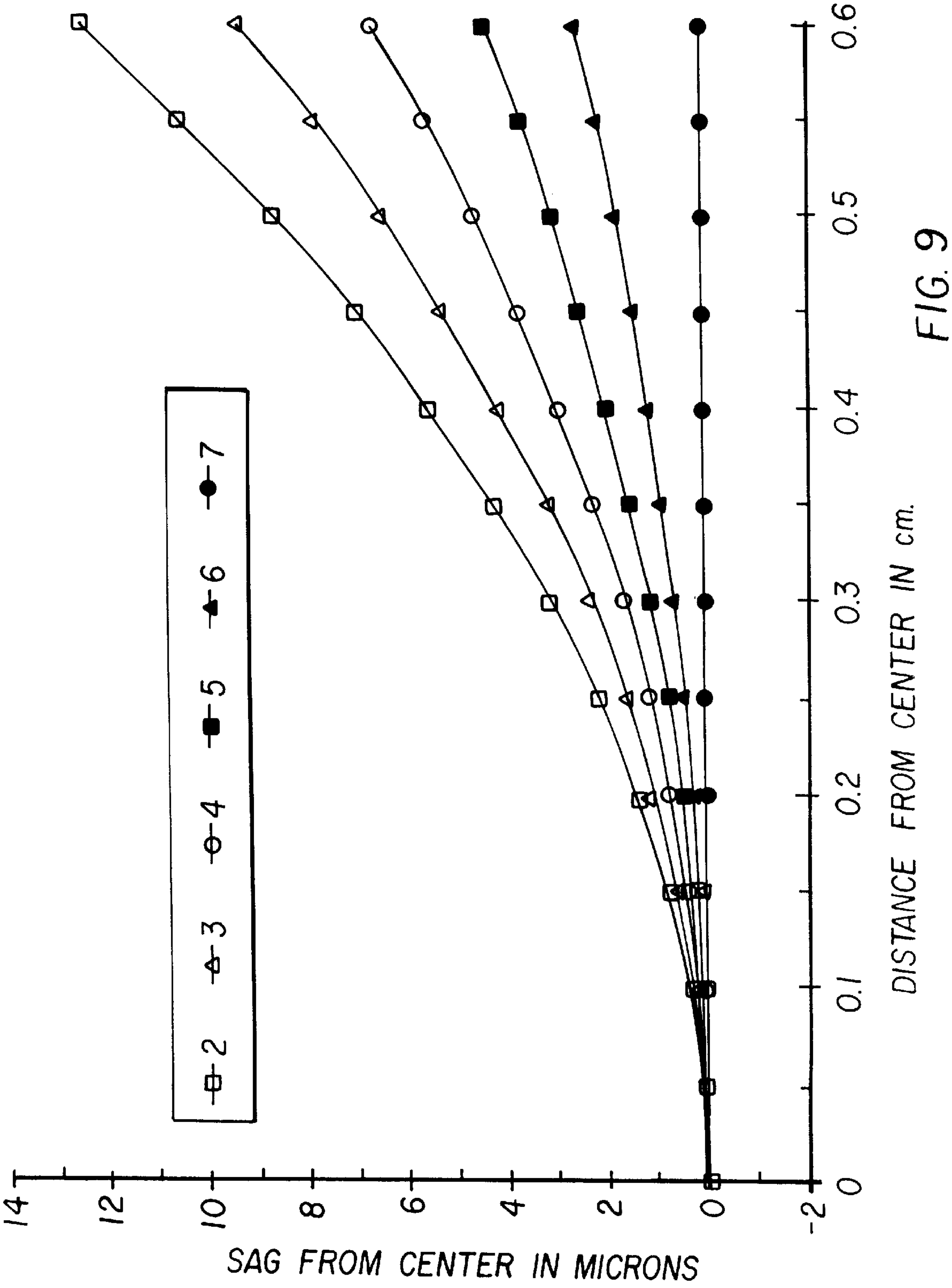
FIG. 9 is a graph of sag or bend in a cylinder lens with a length from the center line of the cylinder lens to a post of a cylinder lens holder of two centimeters.

FIG. 9 shows a graph of the cylinder lens bend for a value of D=2 cm and value of L from 2 to 7 cm. By adjusting D to be greater than L the cylinder lens will sag or bend in an upward direction as shown in a graph in FIG. 10. In this example L is kept at 2 cm and D is varied from 2 to 7 cm producing bend from approximately zero to about 8.7 microns across the 1.0 cm length of the cylinder lens.

Since smiles at the image plane are on the range of 10 to 20 microns, a combination of L and D is calculated to produce a bend which will correct for a significant part of the smile. To correct for smile, the amount of misalignment or the amount by which laser diodes in the laser array deviate form a straight line, must first be determined. The smile is measured by one of two methods. The first method is to measure the profile of the laser array directly using a surface profile measurement device such as a TallyStep. This type of measurement is referred to surface profilometery. An indirect measurement of smile can also be made by projecting laser beams from the laser array 70, shown in FIG. 10, at an image plane. A thick, straight cylinder lens of known focal length, is used to magnify the laser beams and project them onto an image plane located more than a focal length away. The magnification factor will equal to the ratio of the distance to the image plane and the focal length of the cylinder lens. The first method is preferred since it avoids uncertainties in magnification factors.

Values of L and D to correct for smile at the image plane are determined by using the above equations for a known bend value determined by the measurement of smile. A value for L or D is arbitrarily chosen to constrain the equation, and the other value is solved for. The cylinder lens 20 is then placed across the cylinder lens holder 25 using these values of L and D.

Figure 10:
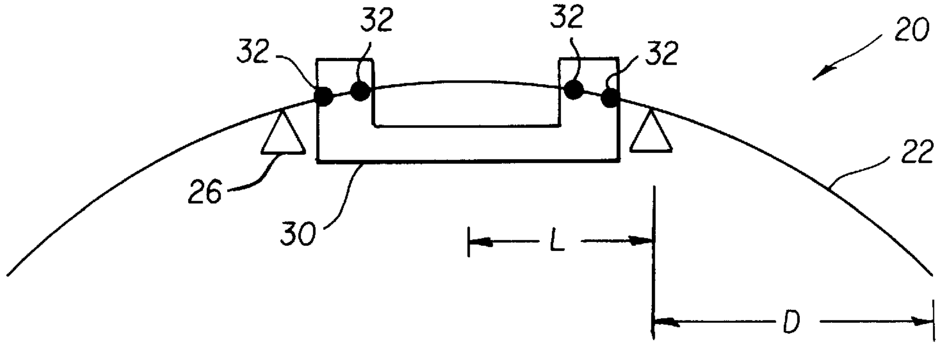
FIG. 10 show a plan view of a bent cylinder lens and attachment points on a sub-mount.

Cylinder lens 20 is temporarily attached to the posts 26 of the cylinder lens holder 25 with adhesive to keep it in place and hold the proper bend until the cylinder lens is attached to the sub-mount 30. The sub-mount 30 is constructed of the same material as the cylinder lens in order to exactly match the thermal expansion of the cylinder lens. The cylinder lens 20 is attached to the sub-mount 30 as shown in FIG. 10. The cylinder lens 20 is bonded to the sub-mount 30 at a minimum of three points in order to constrain the cylinder lens 20 to hold the desired bend. In the preferred embodiment, the cylinder lens 20 is constrained at four locations, two locations at each end of the sub-mount. An ultra violet (UV) curable adhesive 32 is used to hold cylinder lens 20 in sub-mount 30. Since the sub-mount 30 is of the same materials as the cylinder lens, the thermal expansion will be an exact match and the cylinder lens will hold this curvature at different operating temperatures.

Next, an anti-reflection coating is applied to the cylinder lens to achieve additional throughput or optical efficiency. In the preferred embodiment, the coating is applied after the cylinder lens is attached to the sub-mount. The cylinder lens is held by the sub-mount in an evaporator used to apply the anti-reflection coating. The cylinder lens is oriented with the optical path parallel to the evaporation stream to insure that the proper portions of the cylinder lens are coated. This greatly simplifies placing an anti-reflection coating on the cylinder lens. The sub-mount and cylinder lens must be heated when applying the anti-reflective coating. Therefore, the adhesive used to attach the cylinder lens to the sub-mount must be able to withstand these temperatures. Titanium dioxide and silicon dioxide are applied in alternate layers to form the anti-reflective coating.

The next step is to attach flexures 50 to the ends of the sub-mount 30. The flexures 50 have a network of holes 52 through the flexure such that the optical transmission of each flexure is between 10% and 60%. Optical transmission as used here, means that light can pass through an opening in the flexures to activate UV curable adhesive. The range of optical transmission for the flexures 50 is not critical. In the preferred embodiment, the flexures 50, have holes with a staggered pitch which produces an optical transmission through the flexure of approximately 40%.

In the preferred embodiment, the flexures are electroformed of nickel, a relatively inexpensive process and are approximately 0.001 inches thick, although a range of thickness from 0.0005 to 0.005 inches is acceptable. Since the nickel flexures have an optical transmission of 40%, UV curable adhesives are used to attach flexures 50 to sub-mount 30.

Figure 11:
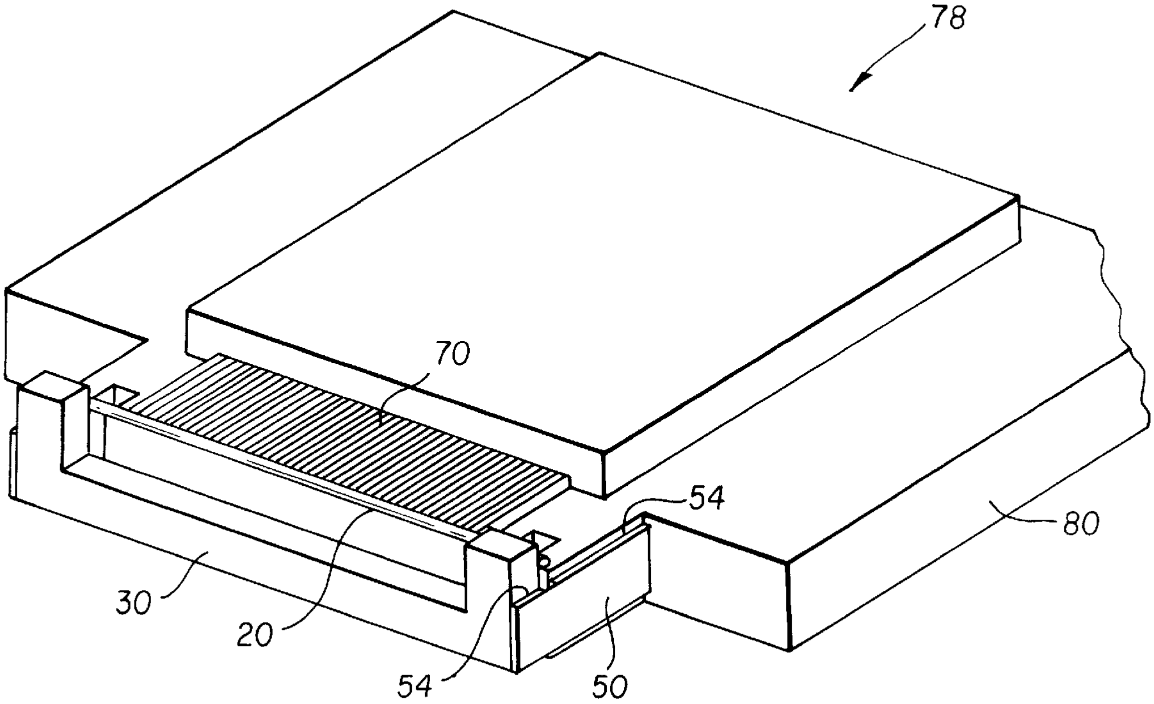
FIG. 11 shows a perspective view of a partially assembled print head.

After the flexures 50 have been attached to the sub-mount 30 and an anti-reflective coating has been applied, the cylinder lens 20 is aligned to the laser array 70 and attached to the print head block 80 by flexures 50 with a UV curable adhesive 32. In the preferred embodiment described above, flexures 50 are attached to the sub-mount 30, before the sub-mount is attached to print head block 80. However, flexures 50 may be attached to print head block 80 first. Alternatively, flexures 50 may be attached to print head block 80 and sub-mount 30 simultaneously, after the alignment step. A partially assembled print head 78 is shown in FIG. 11.

Figure 12:
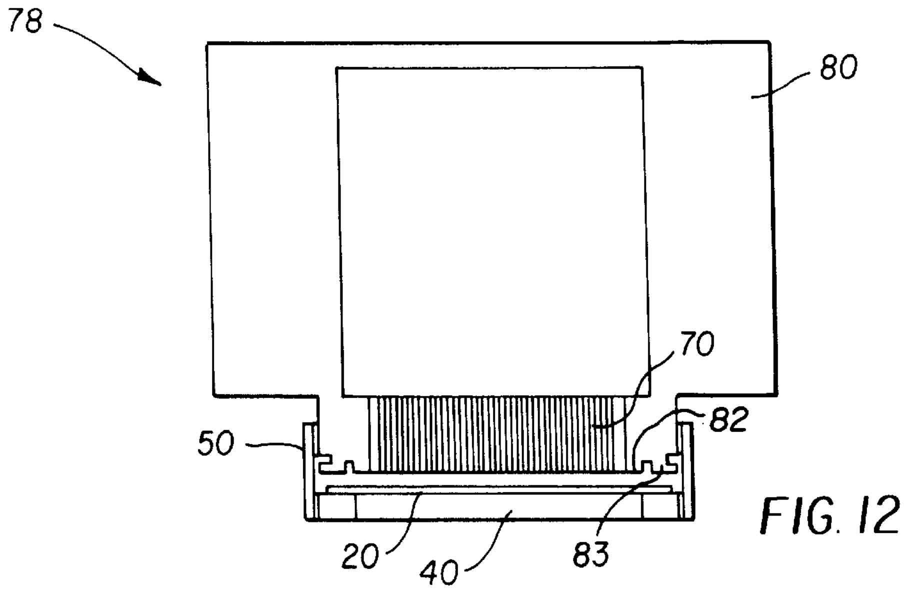
FIG. 12 shows a top plan view of a fully assembled print head.

Slots 82 and 83, in the print head block 80, shown in FIG. 4 and 12, are provided adjacent the flexures 50. These slots are necessary to prevent adhesive 32 from being drawn onto the laser array 70 by capillary action, which severely degrades optical performance. In the preferred embodiment, the slots are in the print head block are as shown, however, the slots may also be placed in the sub-mount.

Cylinder lens 20 and sub-mount 30 are quartz in the preferred embodiment, and a print head block 80 is copper. The differential thermal expansion between the quartz and the copper is 16 micro/meter−°C. Over a temperature range of 15° C. to 45° C., the differential change in length of the 1 cm long laser array is 4.8 microns. If the cylinder lens was bonded directly to the copper print head block, the lens would either sag upon cooling to 15° C. after being heated to 45° C., or separate quartz and the copper is 16 micro/meter−°C. Over a temperature range of 15° C. to 45° C., the differential change in length of the 1 cm long laser array is 4.8 microns. If the cylinder lens was bonded directly to the copper print head block, the lens would either sag upon cooling to 15° C. after being heated to 45° C., or separate from the header. This would produce a gross misalignment of the cylinder lens and the laser array. Using a quartz sub-mount, and a quartz cylinder lens as in the present invention, there is little or no differential thermal expansion between the cylinder lens and the sub-mount, and therefore no sagging of the cylinder lens, and the cylinder lens remains in alignment with the laser array during operation.

Since the cylinder lens and the sub-mount are flexibly attached to the print head block, any difference in axial thermal expansion between the sub-mount and the laser array will not affect alignment of the cylinder lens to the laser array. As the print head block and the sub-mount expand and contract at different rates due to thermal expansion during operation, any small changes in dimensions between the two structures are accommodated by bending of the flexures. The nickel flexures bend in a direction parallel to the cylindrical axis of the cylinder lens, but do not allow the cylinder lens to move in a direction perpendicular to the radius of the cylinder lens. Thus, no misalignment occurs.

The combiner lens 40 used in the preferred embodiment is a binary optic lens array fabricated from quartz and has the same thermal expansion as the cylinder lens 20 and sub-mount 30. Combiner lens 40 is aligned and attached to the sub-mount 30 with a UV curable adhesive. The fully assemble print head 78 is shown in FIG. 12.

The method in this invention provides an attachment method for a cylinder lens to a laser array with a bend in the cylinder lens to correct for smile at the image plane. The flexibility to bend the cylinder lens by different amounts, and then lock the bend into position, allows use of laser arrays from a variety of manufactures.

A micro-optics assembly and print head according to the present invention reduces manufacturing costs. The machining operations for parts used with this invention need not be as precise as prior art fabrication methods, since the flexures between high and low temperatures and operating the laser array at different power levels. The micro-optics assembly, comprised of cylinder lens 20 and sub-mount 30 was operationally tested with combiner lens 40 attached, over a temperature range of 15° C. to 45° C., with no change in alignment.

Any suitable optical glass can be used for the cylinder lens. If the cylinder lens is fabricated from optical glass, the sub-mounts should be fabricated from the same glass, to provide approximately the same thermal expansion. This will give optical engineers a wide variety of optical index glasses from which to design the optimal cylinder lenses.

Adhesives swell with moisture, which can produce misalignment of the cylinder lens as a function of relative humidity. The structure of the present invention uses adhesives to attach the cylinder lens to the sub-mount so that any movement which occurs between the sub-mount and the cylinder lens is in a direction perpendicular to the longitudinal axis of the cylinder lens. The cylinder lens is placed in contact with the sub-mount to further minimize misalignment from swelling of the adhesive. Thus, the adhesive may swell, but the cylinder lens remains in contact with the sub-mount, which helps prevent sagging of the cylinder lens. An indium based solder is used in an alternative embodiment instead of an adhesive, to attach the cylinder lens to the sub-mount. This eliminates any change of position in the cylinder lens with changes in humidity, since the solder does not swell when exposed to moisture.

The use of transparent nickel flexures permits the use of UV curable adhesives which give this process high throughput in production. The use of flexures can be extended to mounting other optics to headers where differential thermal expansion is a consideration.

Figure 13:
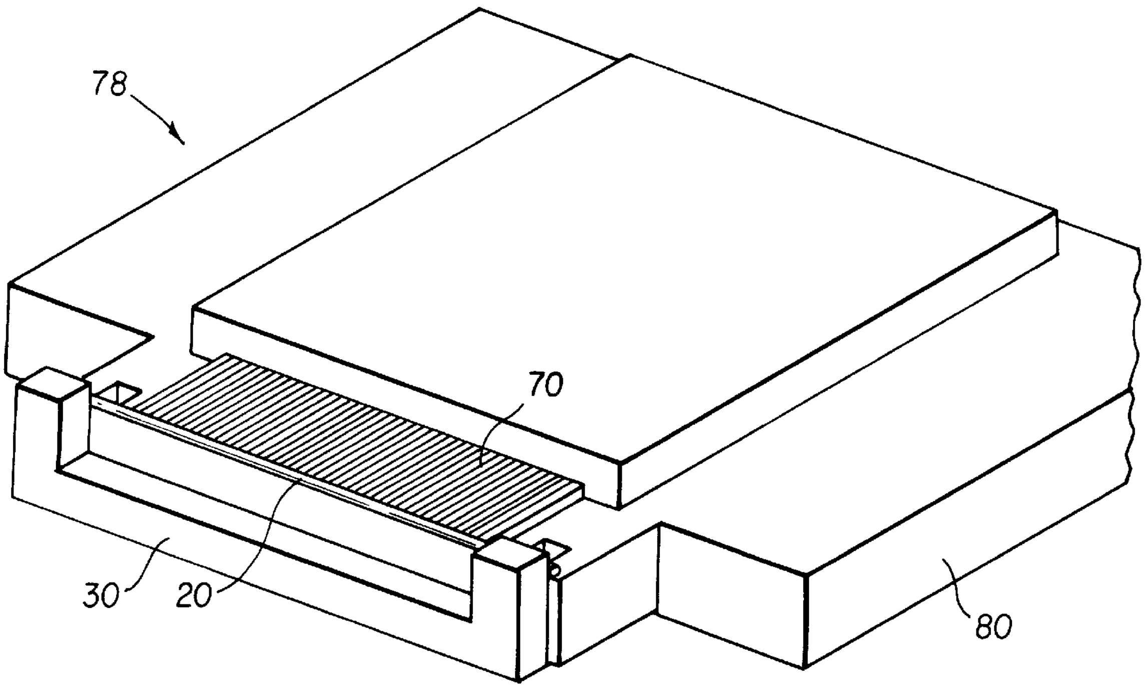
FIG. 13 shows a perspective view of a print head, partially assembled, without flexures.
Figure 14:
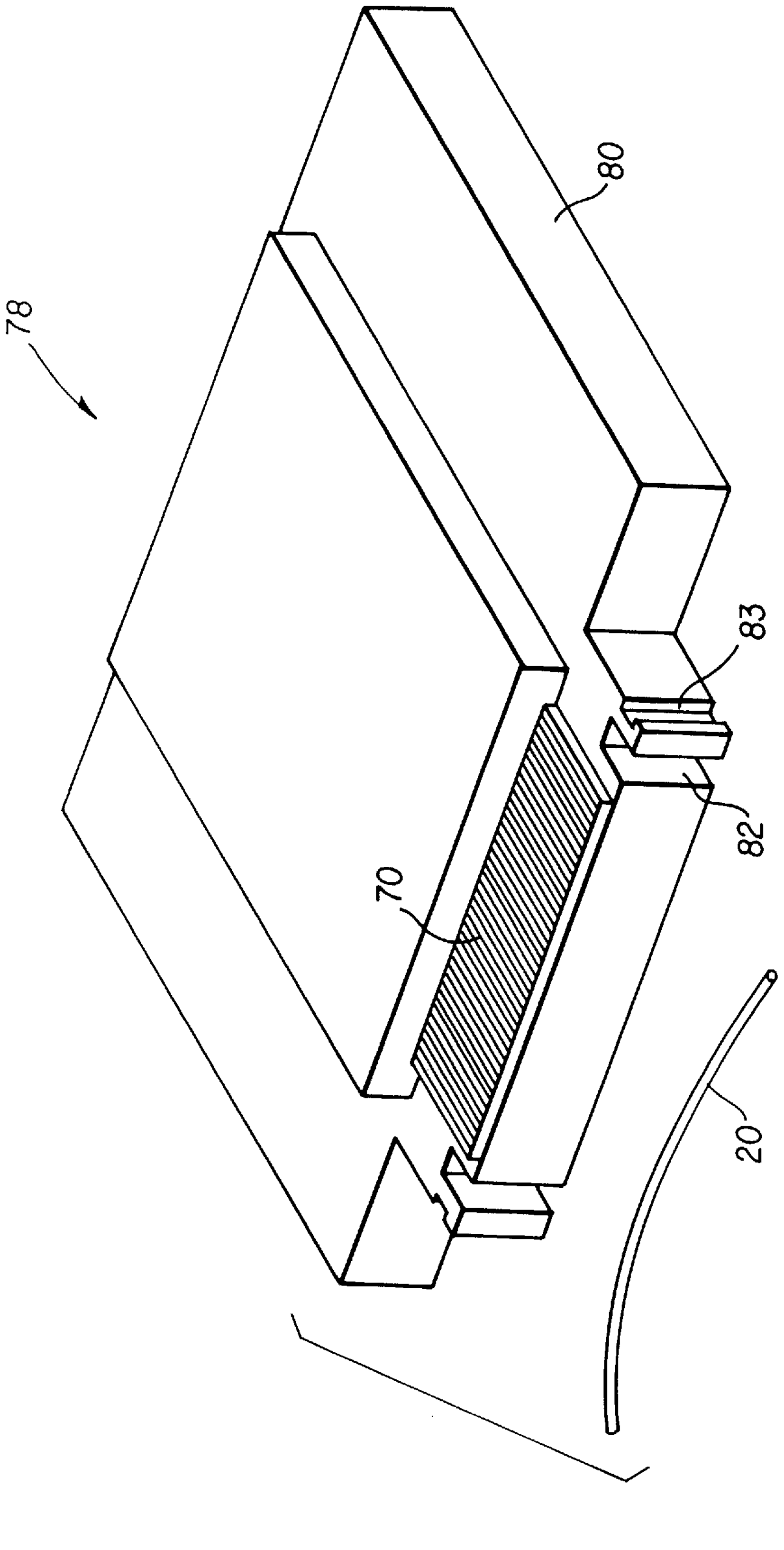
FIG. 14 shows a exploded perspective view of a print head according to the present invention without a sub-mount.

The invention has been described in detail with particular reference to preferred embodiments thereof, but it will be understood that variations and modifications can be effected within the spirit and scope of the inventions as set forth in the claims. For example, the sub-mount may be attached directly to the print head block as shown in FIG. 13 or the cylinder lens may be attached to the print head block without a sub-mount as shown in FIG. 14. In all cases the bend in the cylinder lens must be locked in. In addition, this may be accomplished by a minimum of two attachment point having a width significantly greater than the diameter of the cylinder lens.

Figure 15:
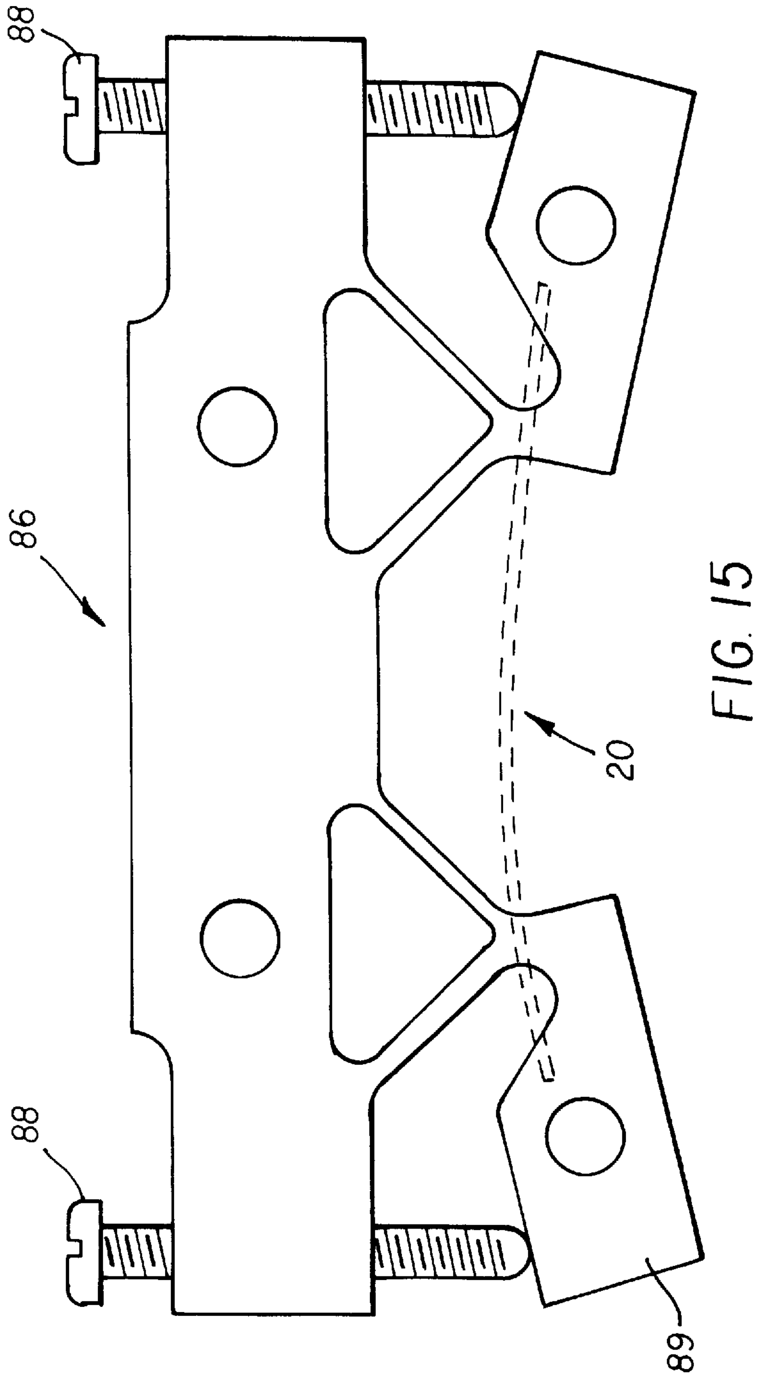
FIG. 15 shows a plan view of a bend fixture for a cylinder lens.

Another method of bending cylinder lens 20 is shown in FIG. 15. A bend fixture 86 holds cylinder lens 20 near the ends of the cylinder lens. As screws 88 are tightened, edges 89 of bend fixture 86 are moved, which places a bend in cylinder lens 20. The cylinder lens may then be attached to a separate sub-mount, or in an alternate embodiment, the bend fixture serves as sub-mount and is attached directly to the print head block.

| PARTS LIST |
|---|
| 10. Micro-Optics Assembly |
| 20. Cylinder Lens |
| 22. Free Ends |
| 25. Cylinder Lens Holder |
| 26. Posts |
| 30. Sub-mount |
| 31. Alignment Slot |
| 32. UV Curable Adhesives |
| 40. Combiner Lens |
| 50. Flexures |
| 52. Holes |
| 54. UV Curable Adhesives |
| 70. Laser array |
| 78. Print head |
| 80. Print Head Block |

-continued

| PARTS LIST |
|---|
| 82. Slots |
| 83. Slots |
| 86. Bend Fixture |
| 88. Screws |
| 89. Edges |

What is claimed is:

1. A method of manufacturing a laser print head comprising the steps of:

mounting a laser array comprised of a plurality of diode lasers on a print head block;

measuring misalignment of said diode lasers in said laser array to determine a correction factor;

mounting a cylinder lens on upright posts of a cylinder lens holder;

inducing a predetermined bend into the cylinder lens corresponding to said correction factor by allowing the cylinder lens to sag on said upright posts of said cylinder lens holder;

attaching said cylinder lens to a sub-mount;

attaching flexures to said sub-mount;

aligning said cylinder lens to said laser array; and attaching said flexures to said print head block.

2. A method as in claim 1 further comprising measuring said misalignment by measuring an array of spots produced by said laser array.

3. A method as in claim 1 further comprising measuring said misalignment by measuring a surface profile of said laser array.

4. A method as in claim 1 further comprising attaching said cylinder lens to said sub-mount with at least three points of attachment to maintain said predetermined bend in said cylinder lens.

5. A method as in claim 4 further wherein said step of attaching said cylinder lens to said sub-mount is accomplished by applying UV curable adhesive to said sub-mount and said cylinder lens.

6. A method as in claim 4 wherein said step of attaching said cylinder lens to said sub-mount is accomplished by applying an indium based solder to said sub-mount and said cylinder lens.

7. A method as in claim 1 wherein said cylinder lens and said sub-mount are comprised of materials having the same thermal coefficient of expansion.

8. A method as in claim 1 further comprising coating said cylinder lens with an anti-reflective coating prior to attaching said sub-mount to said print head block.

9. A method as in claim 1 wherein said flexures have a network of holes which provide optical transmission between 10–60%.

10. A method as in claim 1 wherein said flexures are nickel.

11. A method as in claim 1 wherein said step of attaching said flexures to said print head block is effected by applying a UV curable adhesive to said flexures and said print head block.

12. A method as in claim 1 wherein the sag of said cylinder lens is accomplished by solving the equation $$Z = \frac{w}{2EI}\left[\frac{L^4}{12} + \frac{d^2L^2}{2} + \left(L^2 - \frac{d^2}{2}\right)x^2 - \frac{1}{12}\,x4\right]$$

for a value of D when L is arbitrarily chosen, where:

Z=a height of said predetermined bend w=Distribute Load (Force due to gravity/unit length)

E=Young's Modulus

I=Moment of Inertia of Cross Section of Cylinder Lens r=Radius of the Cylinder Lens L=Length from Center Line of Cylinder Lens to Holder Post D=Length of Cylinder Lens Free End and adjusting a length of the cylinder lens to obtain a free end cylinder length equal to D.

13. A method as in claim 1 wherein sag of said cylinder lens is accomplished by solving the equation $$Z = \frac{w}{2EI}\left[\frac{L^4}{12} + \frac{d^2L^2}{2} + \left(L^2 - \frac{d^2}{2}\right)x^2 - \frac{1}{12}\,x4\right]$$

for a value of L when D is arbitrarily chosen, where:

Z=a height of said predetermined bend w=Distribute Load (Force due to gravity/unit length)

E=Young's Modulus

I=Moment of Inertia of Cross Section of Cylinder Lens r=Radius of the Cylinder Lens L=Length from Center Line of Cylinder Lens to Holder Post D=Length of Cylinder Lens Free End and adjusting a distance separating said upright post to equal 2 L.

14. A method of manufacturing a laser print head comprising the steps of:

mounting a laser array comprised of a plurality of diode lasers on a print head block;

measuring misalignment of said diode lasers in said laser array to determine a correction factor;

mounting a cylinder lens on upright posts of a cylinder lens holder;

inducing a predetermined bend into the cylinder lens corresponding to said correction factor by allowing the cylinder lens to sag on said upright posts of said cylinder lens holder; and attaching said cylinder lens to said print head block.

15. A method of manufacturing a laser print head comprising the steps of:

mounting a laser array comprised of a plurality of diode lasers on a print head block;

measuring misalignment of said diode lasers in said laser array to determine a correction factor;

mounting a cylinder lens on upright posts of a cylinder lens holder;

inducing a predetermined bend into the cylinder lens corresponding to said correction factor by allowing the cylinder lens to sag on said upright posts of said cylinder lens holder;

attaching said cylinder lens to a sub-mount; and attaching said sub-mount to said print head block.

16. A laser print head comprising;

laser array comprised of a plurality of diode lasers attached to a print head block, wherein said laser array has a predetermined misalignment;

a sub-mount attached to said print head block by flexures; and a cylinder lens attached to the sub-mount, wherein said cylinder lens has a predetermined bend corresponding to a predetermined correction factor for said predetermined misalignment and wherein said cylinder lens is aligned with said laser array;

wherein a predetermined thermal expansion coefficient of said sub-mount matches a predetermined thermal expansion coefficient of said cylinder lens;

wherein said predetermined bend of said cylinder lens is induced by permitting said lens to sag while mounted on a cylinder lens holder.

17. A print head as in claim 16 wherein said cylinder lens is attached to said sub-mount by at least three points.

18. A print head as in claim 16 wherein said cylinder lens is attached to said sub-mount by a UV curable adhesive.

19. A print head as in claim 16 wherein said cylinder lens is attached to said sub-mount by an indium based solder.

20. A print head as in claim 16 further comprising a combiner lens attached to said sub-mount, adjacent to said cylinder lens, and on a side of said cylinder lens opposite said laser array.

21. A print head as in claim 16 wherein cylinder lens has an anti-reflective coating.

22. A print head as in claim 16 wherein said flexure has an optical transmission of between 10–60% transparent.

23. A print head as in claim 16 wherein said flexures have a network of holes which provide optical transmission between 10–60%.

24. A print head as in claim 16 wherein said flexures are nickel.

25. A print head as in claim 16 wherein said flexures are attached to said sub-mount by UV curable adhesive.

26. A print head as in claim 16 wherein said flexure is attached to said print head block by a UV curable adhesive.

27. A micro-optic assembly comprising;

a sub-mount having a predetermined thermal expansion coefficient; and a cylinder lens having a predetermined bend, attached to said sub-mount at a minimum of three points, wherein said cylinder lens has a thermal expansion coefficient which corresponds to a thermal expansion coefficient of said sub-mount;

wherein said predetermined bend of said cylinder lens is induced by permitting said lens to sag while mounted on a cylinder lens holder.

28. A laser print head comprising;

a laser array comprised of a plurality of diode lasers attached to a print head block, wherein said laser array has a predetermined misalignment;

a sub-mount attached to said print head block; and a cylinder lens attached to the sub-mount, wherein said cylinder lens has a predetermined bend corresponding to a predetermined correction factor for said predetermined misalignment and said cylinder lens is aligned with said laser array, wherein said predetermined bend of said cylinder lens is induced by permitting said lens to sag while mounted on a cylinder lens holder.

29. A laser print head comprising;

a laser array comprised of a plurality of diode lasers attached to a print head block, wherein said laser array has a predetermined misalignment; and a cylinder lens attached to said print head block, wherein said cylinder lens has a predetermined bend corresponding to a predetermined correction factor for said predetermined misalignment and said cylinder lens is aligned with said laser array, wherein said predetermined bend of said cylinder lens is induced by permitting said lens to sag while mounted on a cylinder lens holder.

* * * * *